(12) United States Patent
Bryan, III (10) Patent No.: US 8,549,788 B2
(45) Date of Patent: Oct. 8, 2013

(54) HYDROPONIC GROWING SYSTEM

(75) Inventor: Morris Bryan, III, Anderson, SC (US)

(73) Assignee: MB3, L.L.C., Anderson, SC (US)

(*) Notice: Subject to any disclaimer, the term of this patent is extended or adjusted under 35 U.S.C. 154(b) by 106 days.

(21) Appl. No.: 13/412,732

(22) Filed: Mar. 6, 2012

(65) Prior Publication Data

US 2013/0232872 A1  Sep. 12, 2013

(51) Int. Cl.
*A01G 31/00* (2006.01)

(52) U.S. Cl.
USPC .......................................... 47/62 C; 47/62 R (58) Field of Classification Search
USPC .................... 47/62 C, 62 R, 62 N, 59 R, 66.6
See application file for complete search history.

(56) References Cited

U.S. PATENT DOCUMENTS

| | | | |
|---|---|---|---|
| 2,189,510 A | 2/1940 | Swaney | |
| 2,713,749 A * | 7/1955 | Hult | 47/62 R |
| 3,660,933 A * | 5/1972 | Wong, Jr. | 47/62 C |
| 3,992,809 A | 11/1976 | Chew | |
| 4,189,867 A | 2/1980 | Schneck | |
| 4,218,847 A | 8/1980 | Leroux | |
| 4,312,152 A | 1/1982 | Drury et al. | |
| 4,468,885 A | 9/1984 | Mandish | |
| 4,513,533 A | 4/1985 | Gething et al. | |
| 5,216,836 A * | 6/1993 | Morris et al. | 47/62 C |
| 5,269,094 A * | 12/1993 | Wolverton et al. | 47/66.6 |
| 5,533,299 A | 7/1996 | Kratky | |
| 5,983,564 A * | 11/1999 | Stragnola | 47/62 R |
| 6,067,750 A * | 5/2000 | Lai | 47/62 R |
| 6,233,870 B1 * | 5/2001 | Horibata | 47/62 R |
| 2005/0241231 A1 | 11/2005 | Bissonnette et al. | |
| 2005/0274073 A1 * | 12/2005 | Brooke et al. | 47/59 R |
| 2008/0120903 A1 | 5/2008 | Fair et al. | |
| 2010/0269409 A1 | 10/2010 | Johnson | |
| 2011/0056132 A1 * | 3/2011 | Gardner | 47/62 R |

FOREIGN PATENT DOCUMENTS

WO  2011062470  5/2011

* cited by examiner

*Primary Examiner* — Monica Williams
(74) *Attorney, Agent, or Firm* — McNair Law Firm, P.A.; Seann P. Lahey (57) ABSTRACT

A hydroponic growing system including a nutrient reservoir and a planting tray having a perimeter air channel for floating on a liquid in the reservoir. A continuous planting trough is included in the planting tray for growing multiple plants in an un-segmented arrangement which is defined by a series of laterally spaced support arms extending across and underneath an opening in a support plate for carrying plant growth materials. The planting tray floats in the reservoir so that a majority of the planting trough is disposed above the liquid in the reservoir to allow for lateral air root growth. A flexible flange is carrier around the perimeter of the planting tray engaging the reservoir to form a light barrier between the planting tray and the reservoir. An air line passes into the reservoir which is connected to an air pump for introducing air into the liquid in the reservoir.

19 Claims, 6 Drawing Sheets

HYDROPONIC GROWING SYSTEM

BACKGROUND OF THE INVENTION

1) Field of the Invention

The present invention relates to hydroponic growing systems, and more particularly, to an improved floating planting tray having a continuous planting trough, light control elements and providing for continuous air root growth during the growing cycle.

2) Description of Related Art

Various hydroponic growing systems are known in the prior art. The type of self-contained growing units for non-commercial home use that have a floating planting tray also have fixed positions for planting individual plants. This creates issues, particularly with larger plants, as the prior art planting trays provides no flexibility in managing the spacing of the plants. Accordingly, there is a need to allow for adjustable spacing between plants in these type of hydroponic growth systems.

Further, the hydroponic growing systems in the prior art fail to adequately facilitate the growth of "air roots". Air roots grow laterally out from the plant seeking air above the liquid nutrient solution used to feed the plants. In traditional systems, the base of the plant is fully submerged in the liquid nutrient solution and air root growth does not occur until the liquid nutrient solution level is reduced via usage and evaporation to create a "void" for the air roots to grow. Also, with this type of system, once the air roots emerge, if the liquid level rises and the air roots are submerged, the plant will essentially drown. With fully floating systems in which the planting tray always is positioned at the water level, there is never an opportunity for air root growth which significantly enhances plant growth.

Additionally, these type of hydroponic growing systems are often placed outside and the prior art does not disclose any system that prevents the sunlight from entering the nutrient reservoir. This can lead to increased evaporation of the liquid nutrient solution and the unwanted growth of algae in the reservoir.

Accordingly, it is an object of the present invention to provide a hydroponic growing system having a planting tray that provides flexibility in managing the spacing of the plants and will accommodate a variety of planting materials.

It is a further object of the present invention to provide a hydroponic growing system having a floating planting tray that provides for the continuous growth of air roots above the liquid nutrient during the duration of the growing cycle.

It is a further object of the present invention to provide a hydroponic growing system having light control elements associated with the planting tray to restrict light entry into the reservoir to reduce the formation of algae and evaporation of the liquid nutrient solution.

SUMMARY OF THE INVENTION

The above objectives are accomplished according to the present invention by providing a hydroponic growing system comprising a nutrient reservoir for holding a liquid plant nutrient solution; a planting tray disposed in the reservoir adapted for floating at the surface of the liquid plant nutrient solution; an air channel included in the planting tray extending around a perimeter of the planting tray, the air channel defined by a series of outer walls laterally spaced from a series of inner walls with opposing inner and outer walls being interconnected by a top wall so that air entering from a bottom side between the inner and outer walls is trapped in the air channel to facilitate floating of the planting tray; a support plate included in the planting tray carried by the inner walls; a planting trough defined by a continuous opening extending generally along the entire length of the support plate and having a series of laterally spaced support arms extending across and underneath the opening for supporting plant growth materials, wherein the planting tray floats on the liquid plant nutrient solution so that a bottom arm portion of the support arms is disposed generally at and in contact with the surface of the liquid plant nutrient solution to allow for lateral air root growth in the planting trough above the surface of the liquid plant nutrient solution; and, a flexible flange extending laterally outward from the outer walls around the perimeter of the planting tray, wherein the flange engages sidewalls of the nutrient reservoir to form a light barrier between the planting tray and the reservoir sidewalls.

In a further embodiment, the hydroponic growing system includes a first raised lip extending along the support plate adjacent a first side of the opening of the planting trough, and a second raised lip extending along the support plate adjacent a second side of the opening opposite the first side.

In a further embodiment, the hydroponic growing system includes a trough cover carried by the support plate covering at least a portion of the opening to block unwanted light entry through the planting trough into the nutrient reservoir.

In a further embodiment, the trough cover includes a first securing flange engaging the first raised lip and a second securing flange engaging the second raised lip to hold the trough cover in position over the planting trough.

In a further embodiment, the support arms of the planting trough each include a first side arm portion and a second side arm portion extending downward from the support plate on opposing sides of the opening, and a bottom arm portion extending generally horizontally interconnecting the first and second side arm portions.

In a further embodiment, the first side arm portion and the second side arm portion are each angled inward toward each other within a range of about 20° to 0° to facilitate lateral air root growth of a plant into the plant growth material lining the planting trough.

In a further embodiment, the hydroponic growing system includes an access port disposed in the support plate for accessing the interior of the nutrient reservoir through the planting tray during plant growth.

In a further embodiment, the hydroponic growing system includes an overflow port disposed in at least one of the sidewalls of the nutrient reservoir so that excess liquid can exit the reservoir when reaching a designated level so that the planting tray avoids rising to a level in which the flexible flange rises above and disengages from the sidewalls of the nutrient reservoir.

In a further embodiment, the hydroponic growing system includes a plurality of chamber walls disposed in the air channel dividing the air channel into a series of chambers to resist the shifting of air through the air channel and facilitate level floatation of the planting tray.

In a further embodiment, the sidewalls of the nutrient reservoir are angled inward toward each other so that the nutrient reservoir is wider at the top than the bottom, and wherein the flexible flange bends to accommodate the inward angle of the sidewalls so that the planting tray lowers with the liquid level in the nutrient reservoir while maintain the light barrier between the planting tray and the nutrient reservoir sidewalls.

In a further embodiment, the flexible flange tapers from a base adjacent the outer walls of the planting tray to a distal end engaging the sidewalls of the reservoir.

In a further embodiment, the hydroponic growing system includes an air line passing through a sidewall of the nutrient reservoir connected to an air pump for introducing air into the liquid plant nutrient solution.

In a further embodiment, the hydroponic growing system includes including an air diffuser disposed at a distal end of the air line in the nutrient reservoir to facilitate the production of uniform small bubbles to oxygenate the liquid plant nutrient solution.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

The objects and features of the invention will become more fully apparent when the following detailed description is read in conjunction with the accompanying figures. However, it is to be understood that both the foregoing summary of the invention and the following detailed description are of a preferred embodiment and not restrictive of the invention or other alternate embodiments of the invention. In particular, while the invention is described herein with reference to one or more specific embodiments, it will be appreciated that the description is illustrative of the invention and is not constructed as limiting of the invention. Various modifications and applications may occur to those who are skilled in the art, without departing from the spirit and the scope of the invention, as described by the appended claims.

DETAILED DESCRIPTION OF A PREFERRED EMBODIMENT

Figure 1:
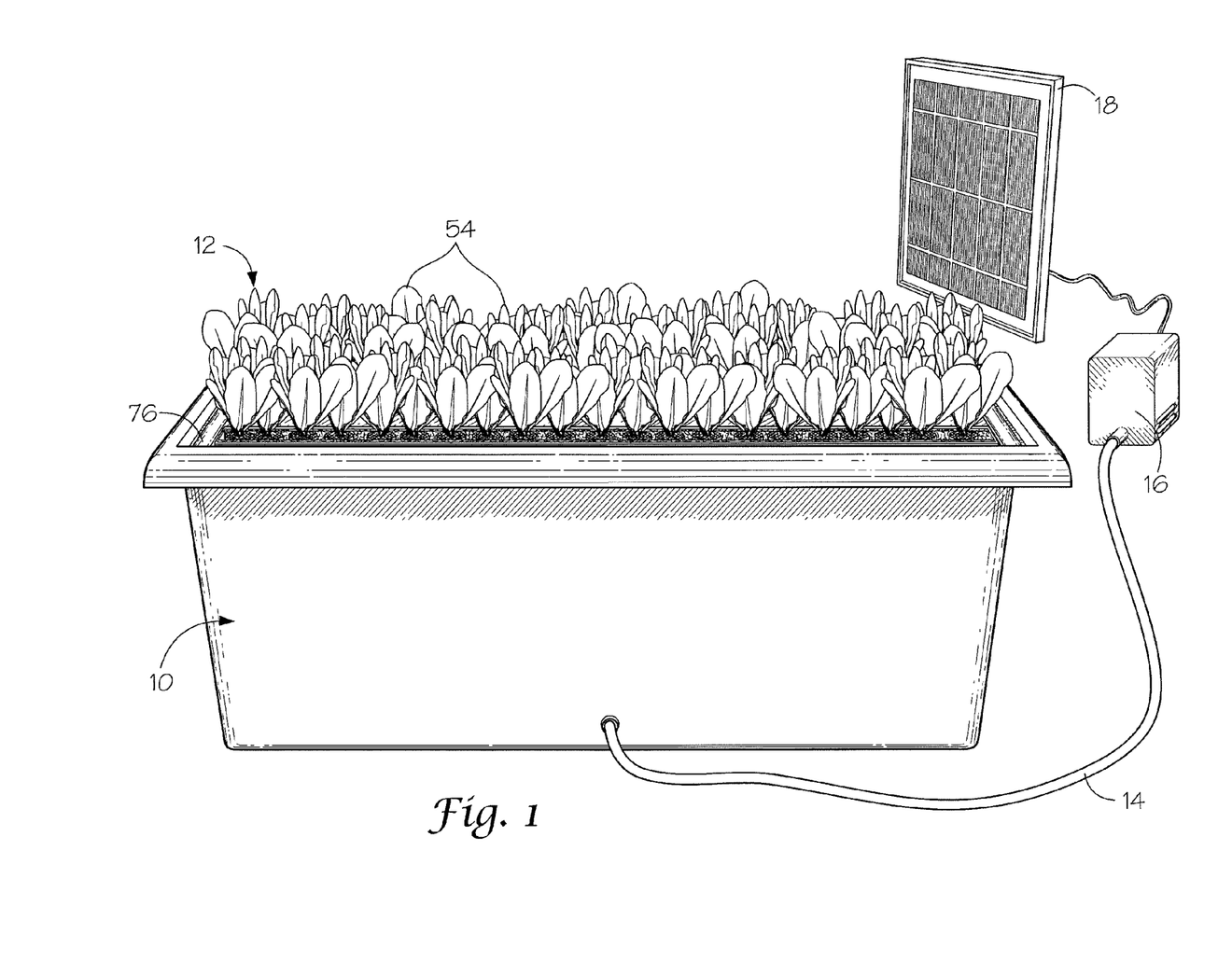
FIG. 1 shows a perspective view of a hydroponic growing system according to the present invention.

With reference to the drawings, the invention will now be described in more detail. Referring to FIG. 1, a hydroponic growing system is shown in a functioning arrangement according to the present invention. In the illustrated embodiment, the system includes a nutrient reservoir, designated generally as 10. The nutrient reservoir 10 holds a liquid plant nutrient solution, which is typically water mixed with various growth supplements. A planting tray, designated generally as 12, is disposed in reservoir 10 that is adapted for floating at the surface of the liquid plant nutrient solution in the reservoir 10. To help oxygenate the liquid in reservoir 10 to facilitate plant growth, an air line 14 passing through a sidewall of reservoir 10. Air line 14 is connected to an air pump 16 for introducing air into the liquid plant nutrient solution of reservoir 10. Preferably, air pump 16 is powered by a solar panel 18 as shown in the illustrated arrangement, to provide for a self-contained growing system. Alternatively, air pump 16 may be battery powered or connected to a typical electrical outlet.

Figure 3:
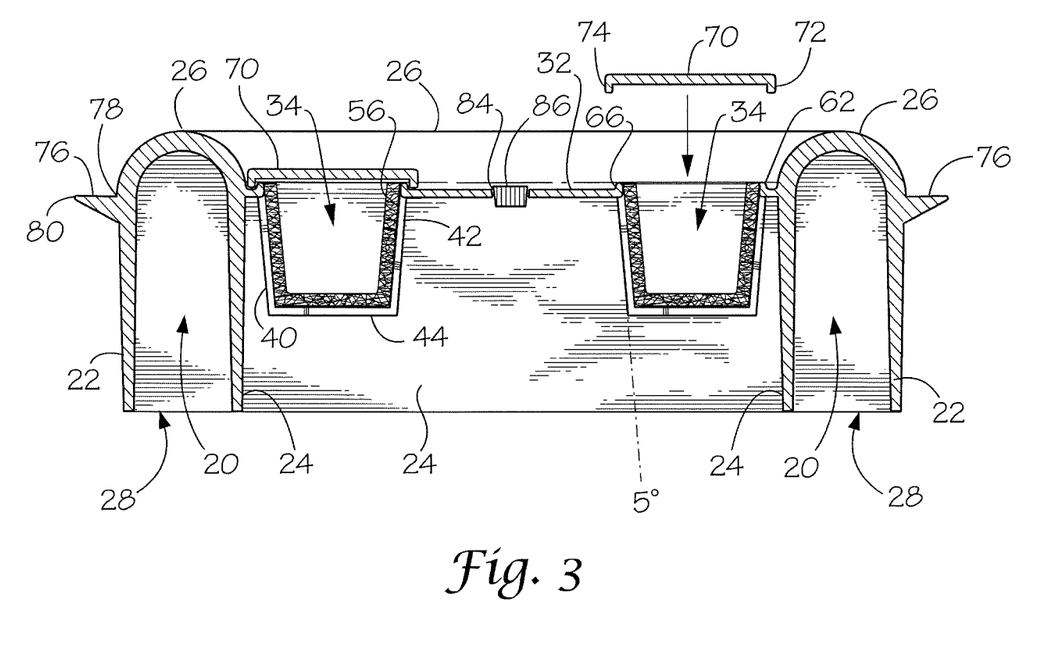
FIG. 3 shows a cross-section view of the planting tray according to the present invention.
Figure 5:
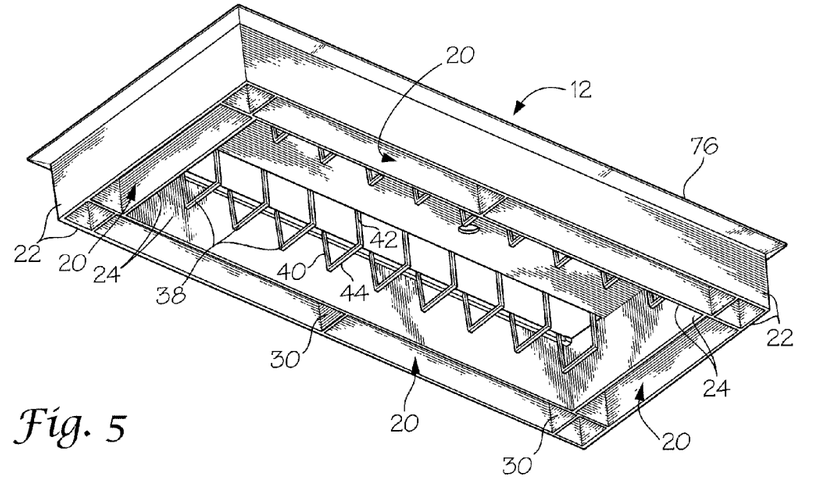
FIG. 5 shows a bottom perspective view of the planting tray according to the present invention.

Referring to FIGS. 3 and 5, planting tray 12 includes an air channel, designated generally as 20, to facilitate floating of planting tray 12 in reservoir 10. In the illustrated embodiment, air channel 20 extends around the entire perimeter of planting tray 12 for increased buoyancy. Air channel 20 is defined by a series of outer walls 22 and inner walls 24. Outer walls 22 extend along each side of planting tray 12, establishing an exterior perimeter of playing tray 12. Each of outer walls 22 is laterally spaced one of inner walls 24 with opposing inner and outer walls being interconnected by a top wall 26. Accordingly, air entering from the open bottom side 28 between the inner 24 and outer walls 22, from bubbles rising through the liquid from air line 14, is trapped in air channel 20 to help float planting tray 12. Essentially, air channel 20 acts as pontoons around each side of the planting tray helping to accommodate the weight of the plants as they grow and maintain planting tray 12 on the surface of the liquid in reservoir 10. Preferably, planting tray 12 may be made of polypropylene, which has a specific gravity of 0.91 and floats on its own to provide additional buoyancy. Other materials known to those skilled in the art may of course provide similar or greater benefit and the invention in not limited to the use of polypropylene, which is stated by way of example only.

Referring to FIG. 5, in a further embodiment, the perimeter air channel 20 includes a plurality of chamber walls 30 disposed throughout air channel 20 that extend between inner and outer walls 22 and 24 and partition air channel 20 into a series of adjacent individual chambers. In this arrangement, the individual chambers resist the shifting of air through air channel 20 and facilitate level floatation of planting tray 12.

Figure 4:
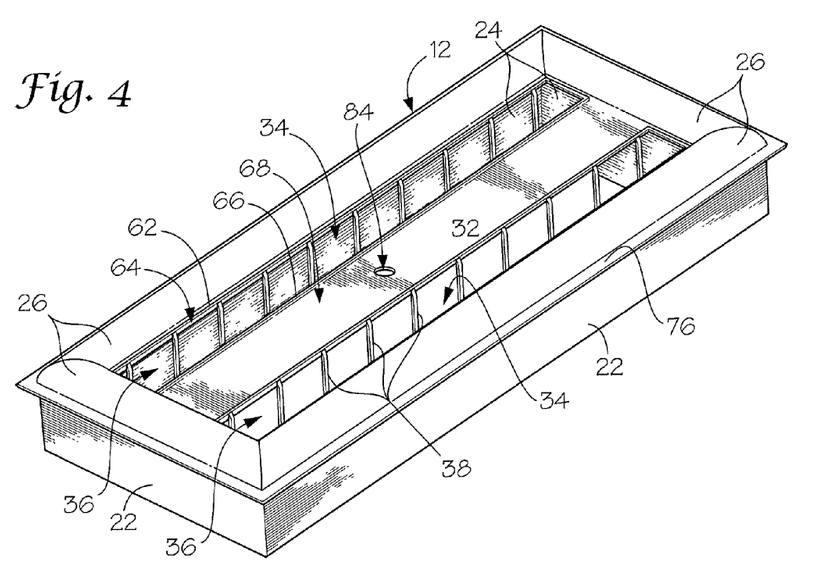
FIG. 4 shows a top perspective view of the planting tray according to the present invention.

Referring to FIG. 4, a support plate 32 is carried by the inner walls 24 within an interior portion of planting tray 12. Support plate 32 includes at least one planting trough, designated generally as 34. In the illustrated embodiment, support plate 32 includes a pair of planting troughs 34 for increased planting capacity. Planting trough 34 comprises a continuous opening 36 in support plate 32 providing access for plants to the liquid in the reservoir 10 below on which planting tray 12 is carried. Preferably, planting trough 34 may extend generally along the entire length of support plate 32 to maximize planting capacity in the interior portion bordered by air channel 20.

Figure 6A:
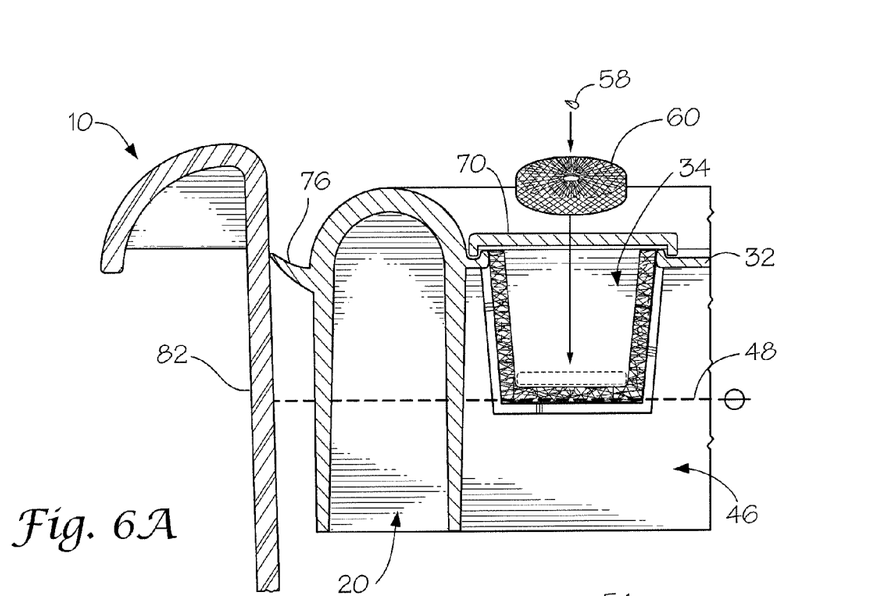
FIG. 6A shows a detailed cross-section view of the planting tray and reservoir with the planting tray floating in an upper portion of the reservoir.
Figure 6B:
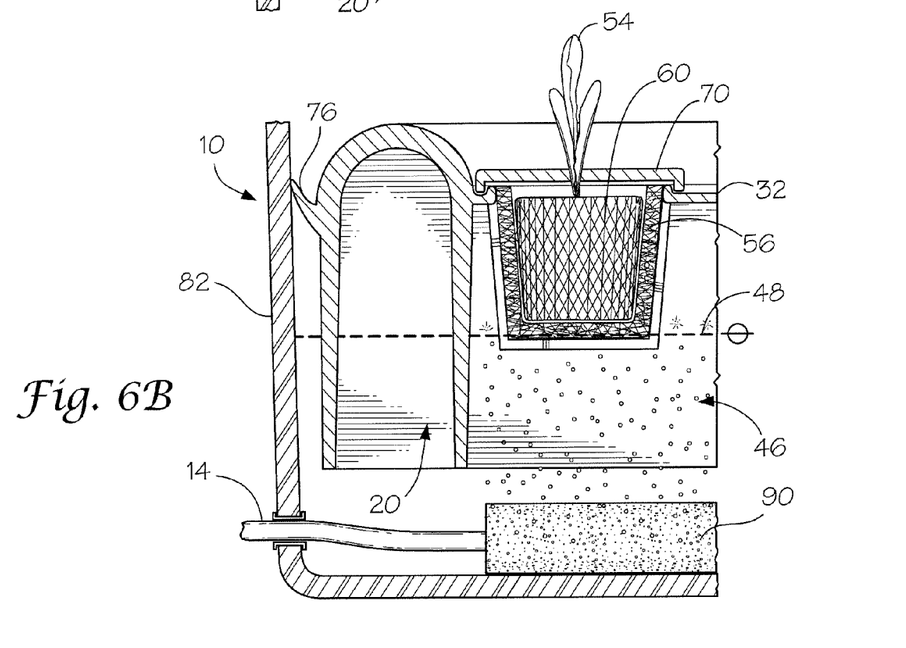
FIG. 6B shows a detailed cross-section view of the planting tray and reservoir with the planting tray floating in a lower portion of the reservoir; and, FIG. 7 shows a detailed cross-section view of the planting trough with lateral air root growth and vertical water root growth.
Figure 7:
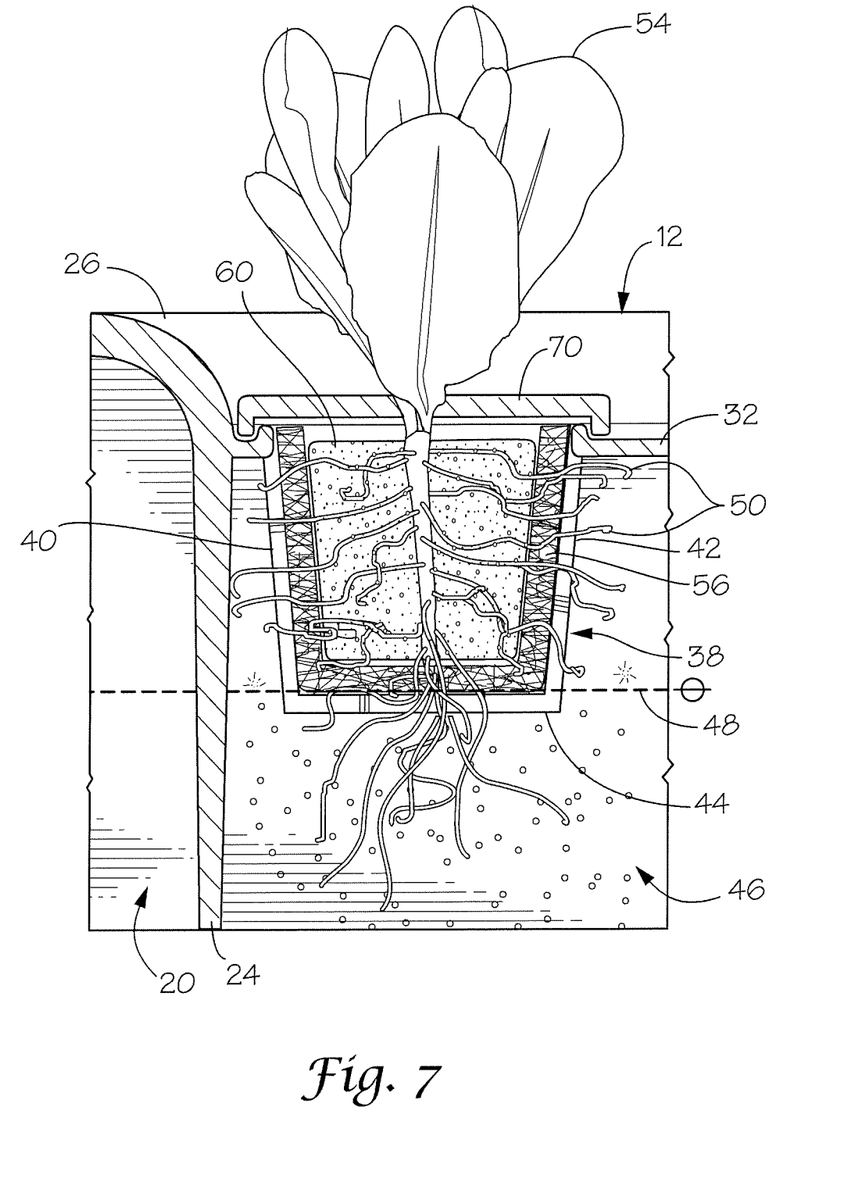

Referring to FIGS. 4 and 5, planting trough 34 further includes a series of laterally spaced support arms 38 extending across and underneath opening 36 for supporting plant growth materials to hold plants. Referring to FIG. 3, in the illustrated embodiment, support arms 38 of planting trough 34 each include a first side arm portion 40 and a second side arm portion 42 extending downward from support plate 32 on opposing sides of opening 36, and a bottom arm portion 44 extending generally horizontally interconnecting the first and second side arm portions 40 and 42. In a preferred arrangement, first side arm portion 40 and the second side arm portion 42 are each angled inward toward each other at about 5° so that planting trough 34 is more narrow at bottom arm portion 44 than at opening 36. Referring to FIGS. 6A, 6B and 7, the angle of first side arm portion 40 and a second side arm portion 42 is important to facilitate lateral air root 50 growth of plant 54 into planting materials lining planting trough 34. In use, planting trough 34 may be lined with a coir sheet 56 type planting material, which is made from coconut fibers, or other similar planting materials. After planting trough 34 is lined with coir sheet 56, a plant seed 58 is placed in a starter growth square 60 made of pete or coco shells, as well know to those in the art. As starter growth square 60 absorbs liquid 46 from reservoir 10 it expands to fill planting trough 34 and is in direct contact with coir sheet 56 as it expands upward. If, however, the angle of first side arm portion 40 and the second side arm portion 42 is to great, a gap can form between starter growth square 60 and coir sheet 56. As lateral air roots 50 exit starter growth square 60, the gap may cause air roots 50 to fail to grow into and through coir sheet 56 for proper plant development. While the preferred embodiment has first side arm portion 40 and second side arm portion 42 angled inward toward each other at about 5°, the angle of each arm portion can range anywhere from about 20° to 0°.

Referring to FIG. 7, planting tray 12 floats on liquid plant nutrient solution, designated generally as 46, so that bottom arm portion 44 of support arms 38 is disposed generally at and in contact with the liquid surface, designated by dotted line 48, to draw liquid 46 into the planting materials carried in planting trough 34. By maintaining the majority of planting trough 34 above liquid 46, planting tray 12 promotes the growth of lateral air roots 50 above the surface of liquid plant nutrient solution 46, while simultaneously providing contact with the liquid 46 at bottom arm portion 44 for downward water root 52 growth of plants 54 in planting trough 34.

Figure 2:
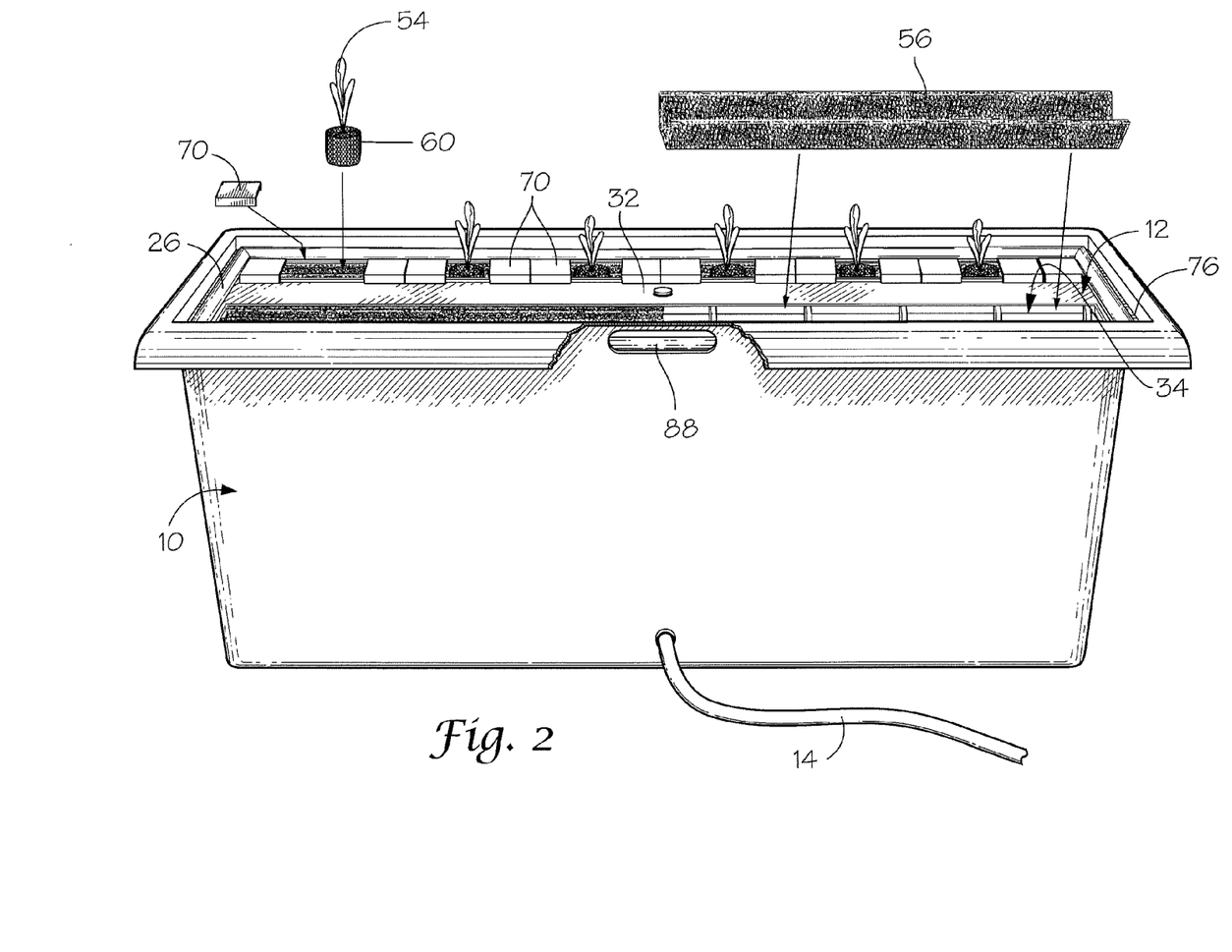
FIG. 2 shows a perspective view of the reservoir and planting tray including a plurality of trough covers according to the present invention.

Referring to FIGS. 3 and 4, in a further embodiment, a first raised lip 62 extends along support plate 32 adjacent a first side 64 of opening 36 of the planting trough, and a second raised lip 66 extends along support plate 32 adjacent a second side 68 of opening 36 opposite first side 64. With further reference to FIG. 2, a trough cover 70 is carried by support plate 32 covering at least a portion of opening 36 to block unwanted light entry through planting trough 34 into nutrient reservoir 10. Preferably, a series of trough covers 70 are provided to cover any area of planting trough 34 not filled with a plant. Each trough cover 70 includes a first securing flange 72 engaging first raised lip 62 and a second securing flange 74 engaging second raised lip 66 to hold trough cover 70 in position over planting trough 34.

Referring to FIGS. 4 and 5, a flexible flange 76 is provided extending laterally outward from outer walls 22 around the perimeter of planting tray 12. Flange 76 engages the sidewalls of nutrient reservoir 10 to form a light barrier between planting tray 12 and reservoir 10 sidewalls. Referring to FIG. 3, in the illustrated embodiment, flexible flange 76 tapers from a base 78 adjacent outer walls 22 of planting tray 12 to a distal end 80 engaging the sidewalls of reservoir 10 to facilitate flexing of the flange 76 as it engages the sidewalls of reservoir 10.

Referring to FIGS. 6A and 6B, in one embodiment, sidewalls 82 of nutrient reservoir 10 are angled inward toward each other so that nutrient reservoir 10 is wider at the top than the bottom. In this arrangement, flexible flange 76 bends to accommodate the inward angle of sidewalls 82 so that planting tray 12 lowers with the liquid level 48 in nutrient reservoir 10 while maintain the light barrier between planting tray 12 and nutrient reservoir sidewalls 82. By bending, flange 70 prevents planting tray 12 from hanging up on the sides of reservoir 10 and instead travels with the liquid level in reservoir 10. Further, by blocking light entry into nutrient reservoir 10, the growth of unwanted algae and evaporation of liquid 46 is restricted.

Referring to FIGS. 3 and 4, in a further embodiment, an access port 84 is disposed in support plate 32 for accessing the interior of nutrient reservoir 10 through planting tray 12 during plant growth. This can be useful to test water quality or inject supplements into reservoir 10 without disturbing the plants. To prevent light entry through access port 84, a plug 86 or cover is employed to block the access port 84.

Referring to FIG. 2, an overflow port 88 is disposed in at least one of the sidewalls of nutrient reservoir 10 so that excess liquid can exit reservoir 10 when reaching a designated level. This is important so that planting tray 12 avoids rising to a level in which flexible flange 76 rises above and disengages from the sidewalls of nutrient reservoir 10.

Referring to FIG. 6B, in a further embodiment, an air diffuser 90 is disposed at a distal end of air line 14 in nutrient reservoir 10 to facilitate the production of uniform small bubbles to oxygenate liquid plant nutrient solution 46.

While a preferred embodiment of the invention has been described using specific terms, such description is for illustrative purposes only, and it is to be understood that changes and variations may be made without departing from the spirit or scope of the following claims.

What is claimed is:

1. A hydroponic growing system, comprising:
a nutrient reservoir for holding a liquid plant nutrient solution;
a planting tray disposed in said reservoir adapted for floating at the surface of said liquid plant nutrient solution;
an air channel included in said planting tray extending around a perimeter of said planting tray, said air channel defined by a series of outer walls laterally spaced from a series of inner walls with opposing inner and outer walls being interconnected by a top wall so that air entering from a bottom side between said inner and outer walls is trapped in said air channel to facilitate floating of said planting tray;
a support plate included in said planting tray carried by said inner walls;
a planting trough defined by a continuous opening extending generally along the entire length of said support plate and having a series of laterally spaced support arms extending across and underneath said opening for supporting plant growth materials, wherein said planting tray floats on said liquid plant nutrient solution so that a bottom arm portion of said support arms is disposed generally at and in contact with the surface of said liquid plant nutrient solution to allow for lateral air root growth in said planting trough above the surface of said liquid plant nutrient solution; and,
a flexible flange extending laterally outward from said outer walls around said perimeter of said planting tray, wherein said flange engages sidewalls of said nutrient reservoir to form a light barrier between said planting tray and said reservoir sidewalls.

2. The hydroponic growing system of claim 1 including a first raised lip extending along said support plate adjacent a first side of said opening of said planting trough, and a second raised lip extending along said support plate adjacent a second side of said opening opposite said first side.

3. The hydroponic growing system of claim 2 including a trough cover carried by said support plate covering at least a portion of said opening to block unwanted light entry through said planting trough into said nutrient reservoir.

4. The hydroponic growing system of claim 3 wherein said trough cover includes a first securing flange engaging said first raised lip and a second securing flange engaging said second raised lip to hold said trough cover in position over said planting trough.

5. The hydroponic growing system of claim 1 wherein said support arms of said planting trough each include a first side arm portion and a second side arm portion extending downward from said support plate on opposing sides of said opening, and a bottom arm portion extending generally horizontally interconnecting said first and second side arm portions.

6. The hydroponic growing system of claim 5 wherein said first side arm portion and said second side arm portion are each angled inward toward each other within a range of about 20° to 0° to facilitate lateral air root growth of a plant into said plant growth material lining said planting trough.

7. The hydroponic growing system of claim 1 including an access port disposed in said support plate for accessing the interior of said nutrient reservoir through said planting tray during plant growth.

8. The hydroponic growing system of claim 1 including an overflow port disposed in at least one of said sidewalls of said nutrient reservoir so that excess liquid can exit said reservoir when reaching a designated level so that said planting tray avoids rising to a level in which said flexible flange rises above and disengages from said sidewalls of said nutrient reservoir.

9. The hydroponic growing system of claim 1 including a plurality of chamber walls disposed in said air channel dividing said air channel into a series of chambers to resist the shifting of air through said air channel and facilitate level floatation of said planting tray.

10. The system of claim 1 wherein said sidewalls of said nutrient reservoir are angled inward toward each other so that said nutrient reservoir is wider at the top than the bottom, and wherein said flexible flange bends to accommodate the inward angle of said sidewalls so that said planting tray lowers with the liquid level in said nutrient reservoir while maintain said light barrier between said planting tray and said nutrient reservoir sidewalls.

11. The system of claim 1 wherein said flexible flange tapers from a base adjacent said outer walls of said planting tray to a distal end engaging said sidewalls of said reservoir.

12. The system of claim 1 including an air line passing through a sidewall of said nutrient reservoir connected to an air pump for introducing air into said liquid plant nutrient solution.

13. The system of claim 12 including an air diffuser disposed at a distal end of said air line in said nutrient reservoir to facilitate the production of uniform small bubbles to oxygenate said liquid plant nutrient solution.

14. A planting tray for a hydroponic growth system, said planting tray comprising:
a series of walls defining a perimeter air channel to facilitate floating of said planting tray on a liquid plant nutrient solution;
a series of laterally spaced support arms extending across and underneath an opening in a support plate carried interior to said perimeter air channel and defining a continuous planting trough for supporting plant growth materials;
a flexible flange extending laterally outward from said walls defining said perimeter air channel for engaging sidewalls of a nutrient reservoir to form a light barrier between said planting tray and said nutrient reservoir when floating on the liquid plant nutrient solution; and,
a plurality of chamber walls disposed in said air channel dividing said air channel into a series of chambers to resist the shifting of air through said air channel and facilitate level floatation of said planting tray.

15. The hydroponic growing system of claim 14 including a trough cover disposed over at least a portion of said planting trough to block unwanted light entry through said planting trough into said nutrient reservoir.

16. The hydroponic growing system of claim 14 wherein said support arms of said planting trough each include a first side arm portion and a second side arm portion extending downward from said support plate on opposing sides of said opening, and a bottom arm portion interconnecting said first and second side arm portions.

17. The hydroponic growing system of claim 16 wherein said first side arm and said second side arm each angled inward toward each other so that said planting trough is more narrow at said bottom arm portion than at said opening.

18. A hydroponic growing system, comprising:
a nutrient reservoir;
a planting tray having a perimeter air channel for floating on a liquid in said reservoir;
a continuous planting trough included in said planting tray for growing multiple plants in an un-segmented arrangement defined by a series of laterally spaced support arms extending across and underneath an opening in a support plate for carrying plant growth materials, wherein said planting tray floats in said reservoir so that a majority of said planting trough is disposed above said liquid in said reservoir to allow for lateral air root growth; and,
a flexible flange carrier around the perimeter of said planting tray engaging said reservoir to form a light barrier between said planting tray and said reservoir.

19. The system of claim 18 including an air line passing into said reservoir connected to an air pump for introducing air into said liquid in said reservoir.

* * * * *